Nov. 15, 1960    R. E. NOVKOV    2,960,013
OFFSETTING ATTACHMENT FOR ROTATING SPINDLE
Filed June 19, 1956    4 Sheets-Sheet 1

INVENTOR.
RAYMOND E. NOVKOV
BY
ATTORNEY

Nov. 15, 1960  R. E. NOVKOV  2,960,013
OFFSETTING ATTACHMENT FOR ROTATING SPINDLE
Filed June 19, 1956  4 Sheets-Sheet 2

INVENTOR.
RAYMOND E. NOVKOV
BY
*J. William Freeman*
ATTORNEY

Nov. 15, 1960    R. E. NOVKOV    2,960,013
OFFSETTING ATTACHMENT FOR ROTATING SPINDLE
Filed June 19, 1956    4 Sheets-Sheet 3

INVENTOR.
RAYMOND E. NOVKOV
BY *J. William Freeman*
ATTORNEY

Nov. 15, 1960  R. E. NOVKOV  2,960,013
OFFSETTING ATTACHMENT FOR ROTATING SPINDLE
Filed June 19, 1956  4 Sheets-Sheet 4

INVENTOR.
RAYMOND E. NOVKOV
BY
*J. William Freeman*
ATTORNEY

United States Patent Office 2,960,013
Patented Nov. 15, 1960

2,960,013

OFFSETTING ATTACHMENT FOR ROTATING SPINDLE

Raymond E. Novkov, Akron, Ohio, assignor, by mesne assignments, to Portage Double Quick, Inc., a corporation of Ohio Filed June 19, 1956, Ser. No. 592,412

10 Claims. (Cl. 90—15)

This invention relates to the art of machine tools, and in particular has reference to offsetting attachments for machine tools of the type that utilize a drill or milling cutter during the machining operation performed by such equipment.

In a general sense, machinery of this type includes a rotating spindle within which may be received or chucked a cutting tool, such as a milling cutter. Depending upon the application involved, this spindle may or may not be moved along its axis during the machining operation to be performed.

It has long been desired to provide a driving attachment for such type of machine tools that would operate to offset the axis of the cutting tool with respect to the axis of the rotating spindle that carries the same. The advantages of such a driving attachment as above indicated, are numerous. First, in the case of an end mill, for example, this attachment could be used to machine or mill a slot of any desired width by the use of an undersized milling cutter with the result that a special cutter would not have to be obtained for each dimension of slot to be machined.

In addition to utilizing undersized milling cutters in the manner just described, such an attachment would also be useful in increasing the effective milling range of each milling cutter carried in stock by a machine shop operator with the result that any width of slot could be cut on an end mill, for example, by having on hand a relatively small number of different sizes of milling cutters.

In co-pending application, Serial No. 470,363, filed November 22, 1954, by Raymond E. Novkov, and now U.S. Patent 2,915,949 there was disclosed an end mill attachment that was operable to offset the axis of an end mill cutting tool with respect to the axis of the rotating spindle portion thereof.

While the above disclosed driving attachment has been found satisfactory in several respects, it has been found that improved results could be obtained providing a more positive and accurate connection to operate and set the offsetting mechanism of such types of attachments.

Specifically, it has been found that in use of the end mill attachment described in the above referred to co-pending application, that the effectiveness of the spindle drive is directly dependent upon the driving connection between a relatively small diameter shaft and a pair of spaced crown splines. In usage, it was found that this connection point between shaft and splines was required to absorb an abnormal amount of turning force with the result that breakage of the splines frequently occurred. Upon such breakage, the driving attachment had to be torn down and replaced with new crown splines in order to resume effective operation of the same.

It has been found that the aforementioned disadvantages of the known prior art can be obviated to a great extent by the use of an improved type of driving connection between the driven and driving members of an off-setting device.

It has been further found that improved results can be obtained if the required turning force at the connection point between driving and driven members is applied over a greater area.

It has been further found that by use of a positive drive to offset the cutting tool with respect to the rotating spindle, that the same can be accurately calibrated relative to the extent of such offsetting movement with the result that accurate settings can be obtained at all times, notwithstanding wear or excessive use of the driving attachment.

It, accordingly, becomes the principal object of this invention to provide an improved type of driving attachment for machine tools that is characterized by the use of a positive drive type offsetting mechanism that accurately displaces the axis of the cutting tool at a predetermined distance from the axis of the spindle.

It is a further object of this invention to provide an improved type driving attachment for machine tools that is characterized by the fact that the same does not lose its accuracy upon repeated usage.

It is a still further object of this invention to provide an improved type driving attachment for machine tool that is extremely durable under extreme conditions of usage with the result that a lower machining cost per unit is obtained.

These and other objects of the invention will become more apparent upon a reading of the following brief specification, considered and interpreted in the light of the accompanying drawings.

Figure 5:
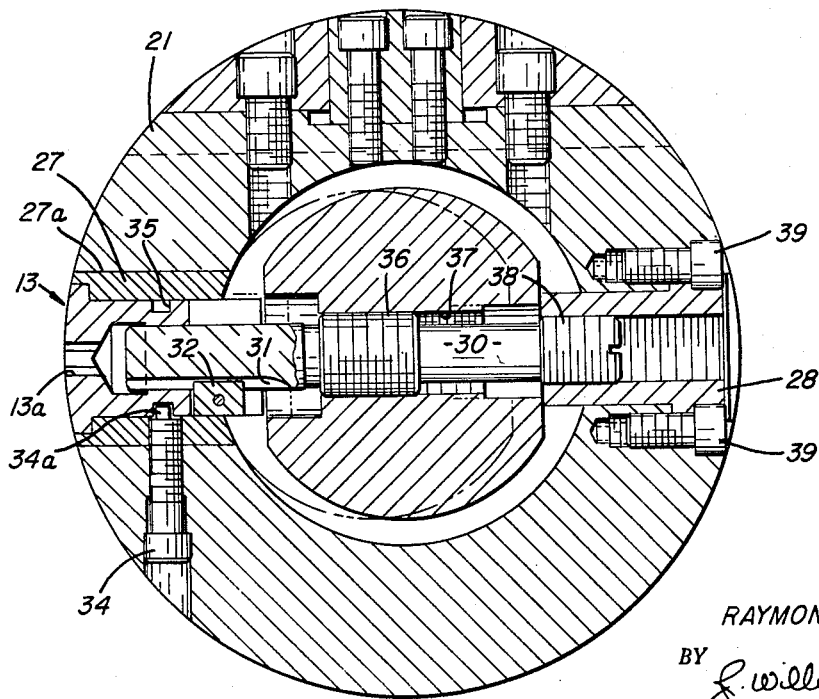
Figure 4:
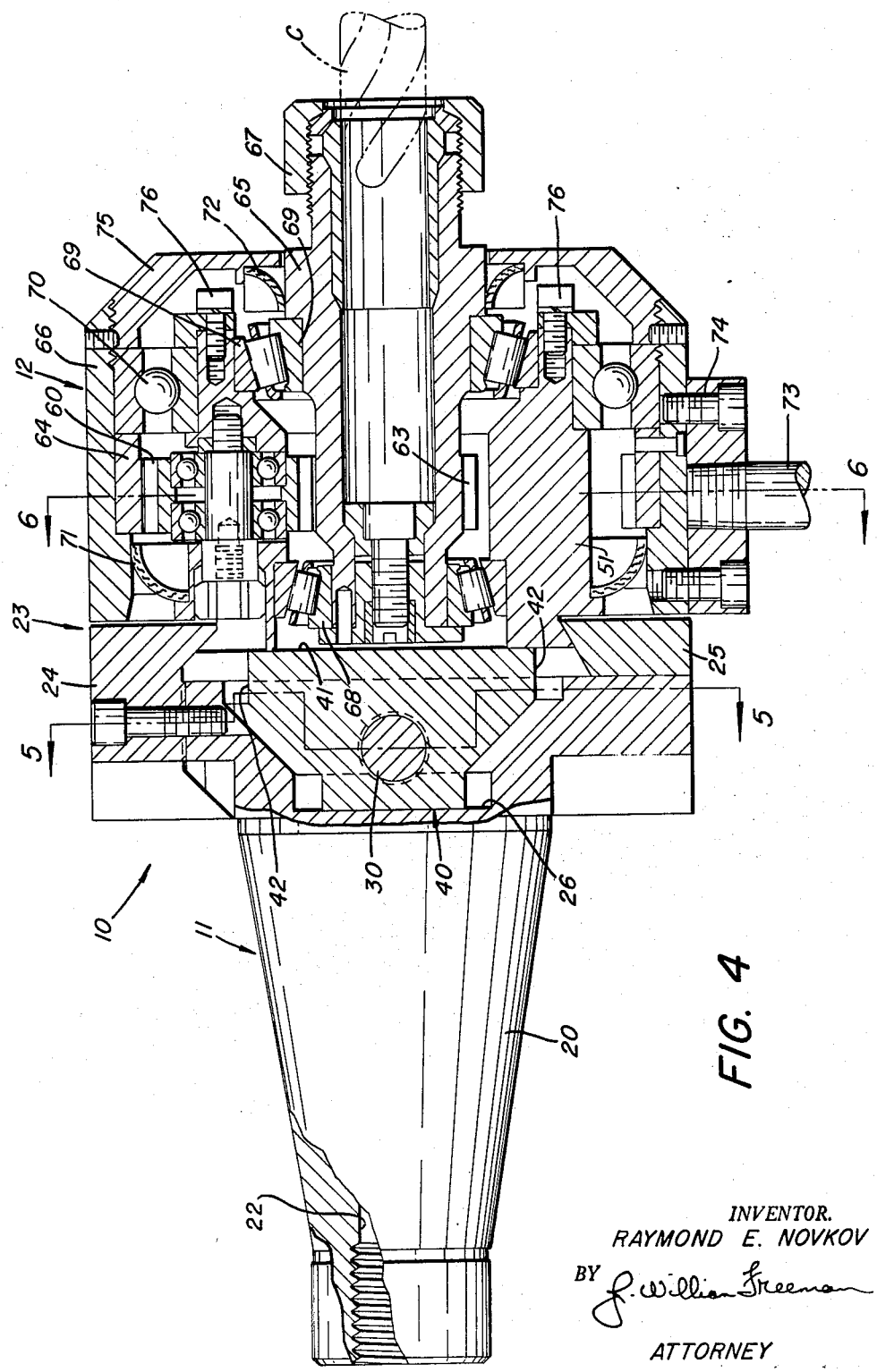
Figure 4 is a sectional view taken in the lines 4, 4 of Figure 1.
Figure 6:
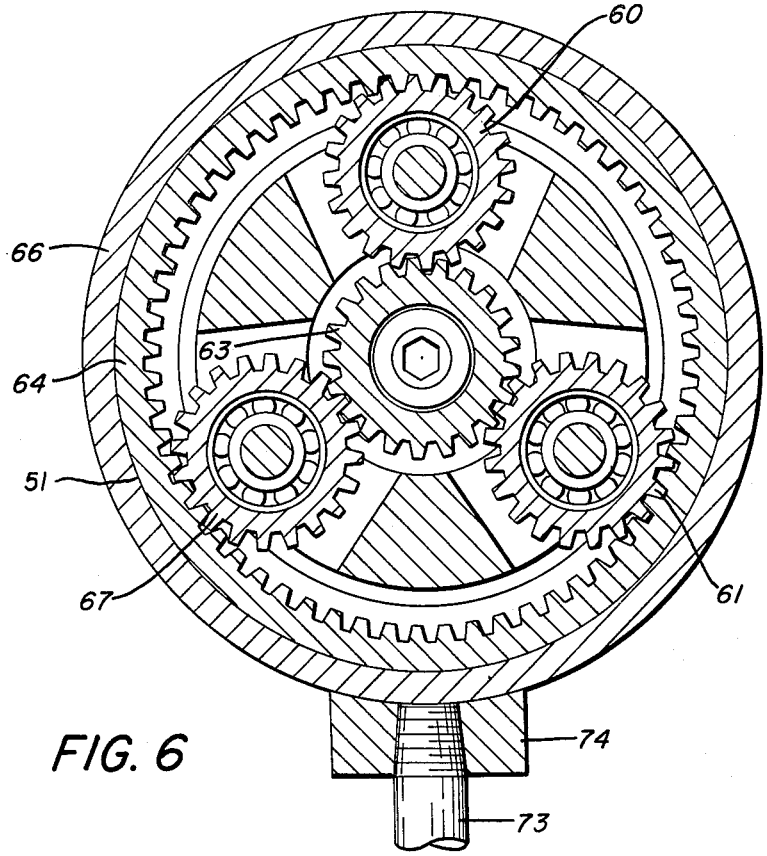

Figures 5 and 6 are sectional views taken on the lines 5, 5 and 6, 6 of Figure 4.

Figure 7:
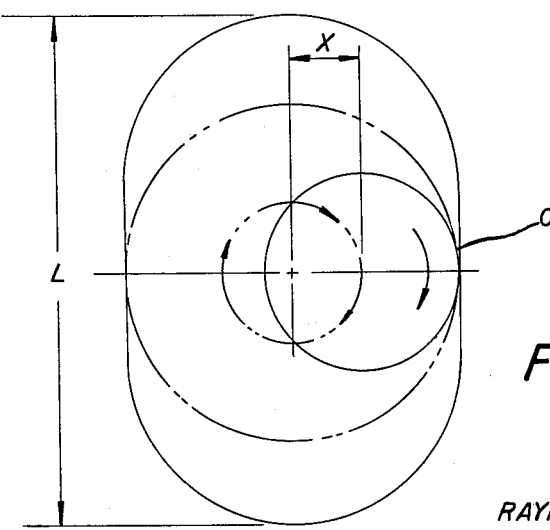

Figure 7 is a schematic view illustrating the orbital path of movement of the cutter C.

Figure 1:
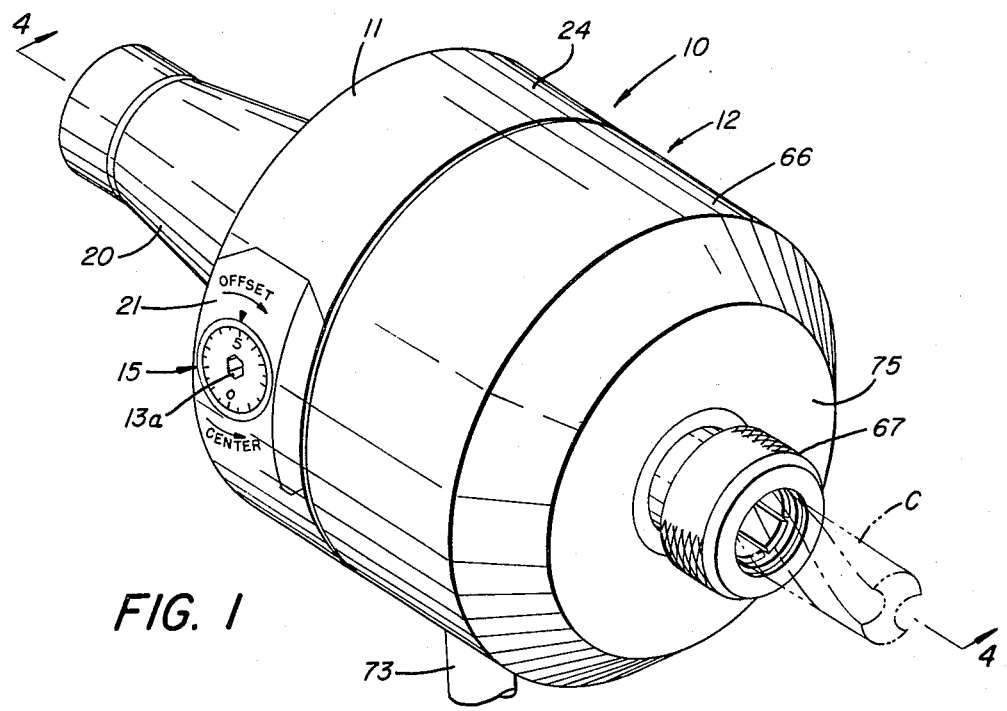
Figure 1 is a perspective view of the improved offsetting attachment.

Referring now to the drawings, and particularly to Figure 1 thereof, the improved driving attachment, indicated generally by the numeral 10, is shown as including a spindle housing 11 that attaches to and rotates about the axis of the machine tool spindle (not shown) so as to drive a milling machine cutter C that is rotatably journalled in a tool housing 12, the arrangement being such that the cutter C and the housing 12 are axially offset as a unit upon movement of an indicator dial 13 as will presently be described.

Figure 2:
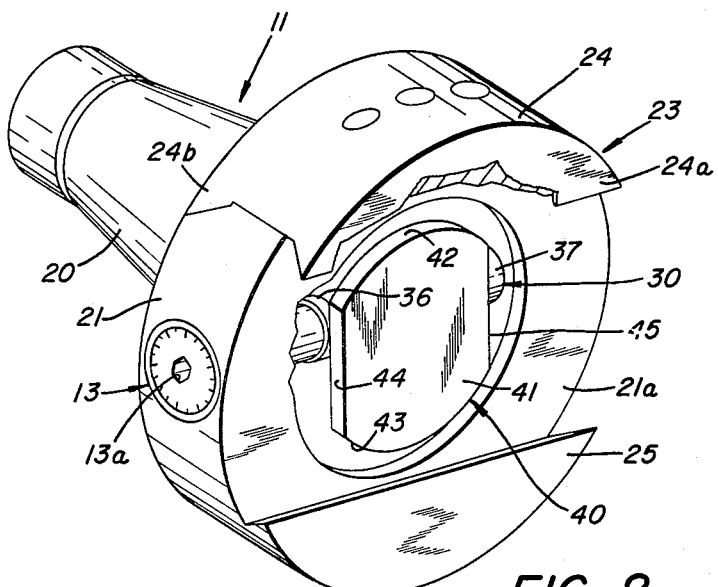
Figure 2 is a perspective view of a broken-away section and illustrating certain component parts of the spindle housing.

Referring first to Figures 2 and 4 for a description of the spindle housing 11, it will be seen that the same includes a tapering shank portion 20 that defines at its enlarged end a mounting head 21, that is of sufficient thickness to receive therein an offsetting nut 40, while the small diameter end thereof includes an appropriate bore 22 within which is received the drive spindle of the machine tool being employed.

As is best shown in Figure 2 of the drawings, the mounting head 21 is of generally cylindrical configuration with the exception of a top portion 23 thereof that is flat in configuration so as to permit reception of a removable dovetail unit that is generally indicated by the numeral 24. The opposite peripheral edge portion of the face 21a includes a complemental dovetail section 25 that is similar in configuration to the above described dovetail unit 24, but is diametrically spaced therefrom as clearly shown in Figure 2 of the drawings, the arrangement being such that the units 24 and 25 together define a transverse guide-way within which the tool housing 12 may be transversely spaced as will be described.

To this end, the face 21a of mounting head 21 is further shown as being centrally recessed to define a tapered recess including a seat that is indicated by the numeral 26 in Figure 4 of the drawing, with a pair of diametrically opposed bushings 27 and 28 being provided in face 21a for the purpose of receiving the adjusting screw 30, as will be described.

For such purpose, and referring now to Figure 5 of the drawings, it will be seen that the bushing 27 is counter-bored at one end as at 27a so as to receive therein the indicator dial 13, with the indicator dial 13 having a central aperture 13a which receives one end of the adjusting screw indicated generally by the numeral 30. This adjusting screw 30, shown best in Figure 5, has a longitudinal slot 31 within which is received a key 32 that is rotatable with the indicator dial 13, with removal of the indicator dial 13 being facilitated by use of a machine screw 34 that has a reduced end 34a receivable in groove 35 of the indicator dial 13.

For purposes to be described, the adjusting screw 30, in addition to the reduced diameter end portion that connects with indicator dial 13 as just described, further includes a central threaded portion 36, a second reduced diameter portion 37, and a second threaded axial end portion 38. In this regard, it is to be noted from Figure 5 of the drawings that the number of threads per inch provided in the portion 36 differ from the number of threads provided per inch on a threaded length 38, with the preferred embodiment of the invention contemplating a greater number of threads per inch in portion 36 than exists in portion 38. As is clearly shown in Figures 2 and 5 of the drawings, the threaded end portion 38 is threadingly received within the threaded interior of the bushing 28 with machine screws 39, 39 serving to retain the same in place with respect to the mounting head 21.

As has been previously indicated, the dovetail unit 24 has a dovetail projection 24a that overhangs the face 21a of the mounting head 21, and to the end of firmly, but releasably, attaching the dovetail unit 24 with respect to the mounting head 21, a second dovetail leg portion 24b is provided at the rearward portion of the unit 24 for complemental engagement with head 21 with apertures 24c, 24c being provided to facilitate fastening of the unit 24 with respect to the mounting head 21.

Figure 3:
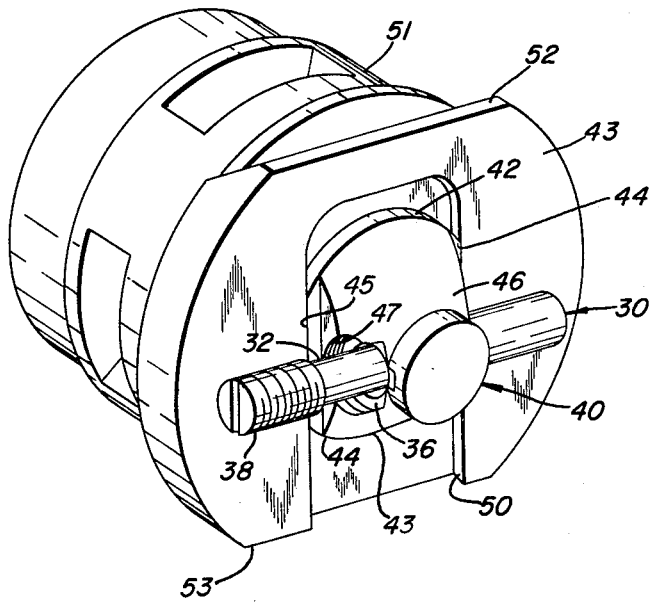
Figure 3 is another perspective view, partly broken-away in section, and illustrating the driving connection between the spindle housing and the milling cutter.

In order that the cutter C may be axially offset with respect to the axis of the spindle housing 11, there is shown in Figures 2 and 3 an offsetting nut that is generally designated by the numeral 40. This off-setting nut 40 is defined by a flat base portion 41 that has arcuate ends 42, 43 which interconnect opposed straight side portions 44 and 45. To the end of mounting the offsetting nut 40 with respect to the adjusting screw 30, the same (offsetting nut 40) further includes a built-up rear portion indicated by the numeral 46, which portion 46 includes a threaded aperture 47 which is designed to threadingly receive the portion 36 of adjusting screw 30 as is clearly shown in Figure 5 of the drawings. In this manner, rotation of the adjustment screw 30 will cause a similar rotation of the threaded portions 36 and 38 thereof with respect to the apertures 47 and the threaded aperture of the bushing 28. As a result of the threaded portions 36 and 38 having a different number of threads per inch, it is apparent that relative movement of the offsetting nut 40 will occur with respect to the bushing 28 upon rotation of the adjusting screw 30. Thus, for the purposes of example, if the thread portion 36 of adjustment screw 30 has 25 threads per inch, while the threaded portion 38 thereof has 20 threads per inch, it is apparent that a relative movement of five threads per inch will occur between the off-setting nut 40 and the bushing 28 upon the required number of revolutions of the adjusting screw 30.

Turning next to the manner in which the spindle housing 11 is connected in driving relationship with respect to the end mill C, it will be seen in Figure 3 of the drawings that the offsetting nut 40 has its flat side portions 44 and 45 received within an appropriate slot 50 that is provided on one end of a planetary gear cage 51. This planetary gear cage 51 is of generally cylindrical configuration with the exception that diametrically opposed edge portions thereof are bevelled to define complemental surfaces 52 and 53 that may be correspondingly received against the dovetail surfaces of the leg portions 24a and the dovetail surface of the unit 25. In this manner the complemental engagement of the surfaces 52 and 53 with the inclined surfaces of the dovetail units 24 and 25, will permit the planetary gear cage 51 to move transversely of the mounting head 21 upon movement of offsetting nut 40.

Turning next to Figure 4 for a consideration of the speed increasing mechanism by which the cutter C is rotated at a higher speed than the spindle housing 11, it has been previously indicated that such a drive mechanism is effectuated by the use of a planetary gearing arrangement wherein the planetary gear cage 51 is moved around the axis of housing 11 as a result of the slot and groove connection of the same with the adjusting nut 40 as has just been described.

Accordingly, in Figures 4 and 5 of the drawings, the planetary gear cage 51 is shown rotatably supporting a series of planetary gears 60, 61 and 62 that are arranged in the customary concentric course of encirclement about the axis of a meshing sun gear 63 and a larger diameter ring gear 64, both of which mesh with gears 60, 61 and 62, with the sun gear 63 being fixed to a sun gear spindle 65 while the ring gear 64 is pressed within the ring gear housing 66 for relative fixed relationship therewith. In this manner, rotational movement of the planetary gears 60, 61 and 62 will also cause a high movement of the meshing sun gear 63, as well as the sun gear spindle upon which the same is secured, and in this manner the cutter C, which is received and clamped within the sun gear spindle 65 by means of a split-collar arrangement indicated generally by numeral 67, will have a higher rotational speed with respect to the spindle housing 11.

In this regard, it is to be noted that the above described planetary gear mechanism includes the standard component parts, such as bearings 68, 69 that are arranged on opposite sides of planetary gears so as to be interposed between the planetary gear cage 51 and the sun gear spindle 65, to thus facilitate relative rotational movement between the planetary gear cage 51 and the sun gear spindle 65. Similarly, a ballbearing unit 70 is shown interposed between the gear cage 51 and the ring gear housing 66 to permit appropriate relative rotational movement therebetween, with seals 71 and 72 being utilized in known manner to prevent leakage of any lubricating medium that is employed in this regard.

As additional components of the overall mechanism just described, it will be further noted that the ring gear housing 66 further includes a handle 73 that extends outwardly from a plate 74 secured to the outer surface of the ring gear housing 66. Preferably the handle 73 will engage against the frame or other component part of the machine for anti-rotation purposes. In this regard, it is preferred that the handle be of sufficient length so as to retain such abutment during the lateral shifting thereof that will occur during rotation of the unit.

In this manner, the gear 64 will be fixed so that upon rotation of cage 51 the gears 60, 61 and 62 will rotate relatively of cage 51 by virtue of being driven by fixed gear 64. These rotating gears 60, 61 and 62 will, accordingly, rotate sun gear 63 to result in the cutter C absorbing all rotational movement that occurs as a result of the rotational movement of the planetary gear housing 51. It is believed apparent that the gearing arrangement above described includes other component parts such as an end cap 75 and a number of bolts indicated generally in this Figure 4 by the numeral 76, with these bolts being employed to fasten and retain the various component parts as just described in their appropriate positions.

Use or operation of the improved device

In use or operation of the improved offsetting device 10, it will first be assumed that the component parts of the invention have been assembled together to form the complete unit 10 that is shown in Figures 1 and 4 of the drawings with the cutter C being concentric to the axis of the spindle housing 11 and being firmly secured within the sun gear housing 65 as a result of the split-collar means 67 having been tightened.

At this time, it will be assumed that it is desired to offset the axis of the cutter C .0005 inch with respect to the axis of the spindle housing 11. To effectuate such an offsetting, it is merely necessary that dovetail section 24 be loosened by backing off the attaching bolts therefor and then the dial indicator 13 may be turned to the appropraite marking thereon with offsetting being effectuated, as shown in Figure 1 of the drawings by a clockwise rotational movement for approximately five graduations of the dial indicator 13. At this time the dovetail unit 24 may be retightened.

As a result of this turning movement, it is believed apparent that the key 32, as a result of being received in slot 31, will cause the adjusting screw 30 to rotate in a similar direction with the result that the threaded portions 36 and 38 thereof will turn in the appropriate threaded apertures of nut 40 and bushing 28 respectively.

Because of the aforementioned difference in the number of threads per inch on the threaded sections 36 and 38, it is believed apparent that a micrometer adjustment will be obtained with the result that the adjusting nut 40 will shift from the chain-dotted line position of the Figure 5 to the full line position thereof with further rotational movement acting to offset the adjusting nut 40 even further to the right of Figure 5.

It is believed apparent that this transverse shifting movement of the adjusting nut 40 will also cause a similar transverse movement to occur with respect to the planetary gear cage 51 as a result of the offsetting nut 40 being received in the slot 50 of the planetary gear cage 51 as has previously been described. This transverse shifting movement that has just been mentioned will be guided at all times as a result of the tapered way type connection that exists between the surfaces 52 and 53 and the appropriate surfaces of the dovetail units 24 and 25.

When the required amount of transverse shifting of cutter C has occurred, with the result that the same has been offset to the required amount with respect to this axis of the spindle housing 11, it is merely necessary that the spindle housing 11 be rotated, by initiating operation of the machine tool to which the same is attached. This rotational movement of the spindle housing 11 will result in the planetary gear cage 51 being driven as a result of its just described attachment with respect to the adjusting nut 40, and, accordingly, this rotation of the planetary gear cage 51 will cause the planetary gears 60, 61 and 62 to rotate about a concentric circular course of movement about the axis of the cutting tool C.

During such rotational advancement of the planetary gears 60, 61 and 62, it is apparent that the same will be meshing with both the sun gear 63 and the ring gear 64 and because the ring gear 64 is held against rotation as a result of the handle 73 being fixed against appropriate object on the machine tool, it is apparent that rotational movement will occur only with respect to the sun gear 63 which, together with the sun gear spindle 65, will rotate at a relatively faster speed than spindle 11, with bearings 68, 69 and 70 facilitating such relative rotational movement between the respective parts just described.

As a result of being off-set as just described, the cutter C, in addition to rotating about its own axis, will rotate orbitally about the axis of the revolving spindle 11 with the result that the cutting edges thereof revolve through an enlarged arcuate path of movement designated by the numeral 90 in Figure 7 of the drawing, with the degree of offset between the cutter C and the spindle housing 11 being indicated by the designation X in Figure 7.

It will further be seen in this regard that an elongated slot of length L can be cut by using a cutter C that is considerably smaller in diameter than either the width of the slot or the length L thereof. It is to be noted that the elongated length L is obtained by merely moving the work table relative of the spindle 11 in the manner well known in the machine tool art.

From the foregoing, it is believed apparent that there has been provided an improved type of offset drive for rotating milling cutters. It has been shown how the positive driving connection between a planetary gear cage and an offsetting nut provides a wide area of contact through which a turning force can be applied. It has been shown how the use of turning force can be applied. It has been shown how the use of a double pitched adjustment screw has facilitated the manner in which the accuracy of the amount of offset can be positively determined, with the result that extremely accurate dimensions can be obtained with the use of the aforementioned adjustment screw.

A still further advantage of the above type driving attachment is found in the fact that use of such an attachment operates to obviate chip congestion within the cutting flutes of the milling cutter. Such a problem appears frequently in milling or otherwise machining a slot when the width of the same is exactly the same as the diameter of the cutter employed. By employing an offset device of the type above described, it is believed apparent that at all times there is but one cutting flute in contact with the work being machined with the result that the chips accumulating in the remaining flutes will be easily disposed of in view of the fact that these flutes are, at all times, except during the actual cutting operation, out of contact with the part being machined, thus, the remaining flutes will open for discharge of the chip material that normally accumulates in the same. Similarly, because of the wide path cut, greater space is provided for chip removal.

In accordance with the patent statutes, there has been provided in this specification a full, clear and complete description of the component parts involved. It is to be understood, however, that the invention is not intended to be so limited.

It, accordingly, follows that modifications of the invention may be resorted to without departing from the spirit hereof or the scope of the appended claims.

This application is a continuation-in-part of applicant's copending application, Serial No. 470,363, filed November 22, 1954, now Patent No. 2,915,949 issued Dec. 8, 1959.

What is claimed is:

1. An offsetting attachment for machine tools, comprising: a driving spindle having an axis of rotation and having a forward face substantially normal to said axis of rotation; a driven member having an axis of rotation and having a mounting face disposed substantially normal to one axial end of said axis of rotation thereof; mounting means for mounting said faces in coplanar abutment with each other and rotating the same in unison around the axis of rotation of said driving spindle; shifting means for shifting one said face transversely of the other said face in a straight line path of movement, while retaining contact therebetween; a housing concentrically encircling said driven member; a cutting tool disposed in concentricity with the axis of rotation of said driven member; and driving means mechanically interconnecting said driven member with said housing and said cutting tool and being operable to rotate said cutting tool at a different speed than said driving spindle and said driven member; said driving means being operable upon rotation of said driven member relatively of said housing.

2. An offsetting attachment for machine tools, comprising; a driving spindle having an axis of rotation and having a forward face substantially normal to said axis of rotation; a driven member having an axis of rotation and having a mounting face disposed substantially normal to one axial end of said axis of rotation thereof; mounting means for mounting said faces in coplanar abutment with each other and rotating the same in unison around the axis of rotation of said driving spindle; shifting means for shifting one said face transversely of the other said face in a straight line path of movement, while retaining contact therebetween; a housing concentrically encircling said driven member; a cutting tool disposed in concentricity with the axis of rotation of said driven member; and driving means mechanically interconnecting said driven member with said housing and said cutting tool and being operable to rotate said cutting tool at a different speed than said driving spindle and said driven member.

3. The device of claim 2 further characterized by the fact that said mounting means include a transverse way provided on one said face and receiving therein a complemental projection defined by said other face.

4. The device of claim 3 further characterized by the fact that said way has dovetail guide surfaces, whereby said faces are maintained in coplanar abutment during said transverse movement.

5. The device of claim 2 further characterized by the fact that said driving means include at least one planetary gear rotatably carried by said driven member adjacent the peripheral portion thereof; a ring gear carried by said housing and meshing with said planetary gear; a sun gear fixed with respect to said cutting tool and meshing with said planetary gear.

6. The device of claim 2 further characterized by the fact that said shifting means include an adjustment screw rotatably supported by said driving spindle transversely of the face portion thereof; an adjustment nut carried by said adjustment screw and being exposed with respect to the face portion of said driving spindle; said adjustment nut being non-rotatably and releasably interconnected with said face of said driven member, whereby rotation of said adjustment screw moves said nut and said driven member radially of said driving spindle in a straight line path of movement.

7. The device of claim 6 further characterized by the fact that said adjustment screw is threadingly supported by said driving spindle and is threaded for reception of said adjustment nut; the pitch of said threaded portion receiving said adjustment nut being different than the pitch of the threaded portion received in said driving spindle.

8. An offsetting attachment for machine tools, comprising; a driving spindle having an axis of rotation and having a planar face normal thereto at its forward end; said face having a transverse way, with said way being axially recessed adjacent the central portion thereof; an adjustment screw extending transversely of said face portion thereof and having a threaded central portion disposed in said recess; an adjustment nut encircling said adjustment screw and being normally disposed in said recess; a driven member having an axis of rotation and including a mounting face disposed substantially normal to said axis of rotation at one axial end thereof; opposed edge surfaces defined by said mounting face and being receivable against said way of said driving spindle; a recess extending inwardly from said mounting face and receiving said adjustment nut in mechanically interlocked, non-rotatable relationship therewith; a housing concentrically encircling said driven member; a cutting tool disposed in concentricity with the axis of rotation of said driven member; and driving means mechanically interconnecting said driven member with said housing and said cutting tool and rotating said cutting tool at a different speed than said driving spindle and said driven member.

9. The device of claim 8 further characterized by the fact that said driving means are operable upon rotation of said driven member relatively of said housing.

10. The device of claim 8 further characterized by the fact that said driving means include at least one planetary gear rotatably carried by said driven member adjacent the peripheral portion thereof; a ring gear carried by said housing and meshing with said planetary gear; a sun gear fixed with respect to said cutting tool and meshing with said planetary gear.

References Cited in the file of this patent

UNITED STATES PATENTS

| 472,126 | Johnson | Apr. 5, 1892 |
| 721,930 | Zellers | Mar. 3, 1903 |
| 973,542 | Muehlmatt | Oct. 25, 1910 |
| 2,247,562 | Santen | July 1, 1941 |
| 2,564,460 | Blanco | Aug. 14, 1951 |
| 2,608,807 | Nilsen et al. | Sept. 2, 1952 |
| 2,654,610 | De Vlieg | Oct. 6, 1953 |

FOREIGN PATENTS

| 857,704 | France | Apr. 22, 1940 |
| 985,591 | France | Mar. 14, 1951 |